United States Patent [19]

Goggins, Jr.

[11] 4,005,414
[45] Jan. 25, 1977

[54] METHOD FOR PROVIDING MEANS TO ELIMINATE AMBIGUOUS POLARIZATION EFFECTS ON PHASE AND AMPLITUDE OF RADAR BACKSCATTER DUE TO UNKNOWN TARGET ASPECT ANGLE

[75] Inventor: William B. Goggins, Jr., Locke Mills, Maine

[73] Assignee: The United States of America as represented by the Secretary of the Air Force, Washington, D.C.

[22] Filed: June 24, 1975

[21] Appl. No.: 589,805

[52] U.S. Cl. .......................... 343/5 SA; 343/100 SA
[51] Int. Cl.² ................................................ G01S 9/00
[58] Field of Search ..................... 340/5 SA, 100 PE

[56] References Cited

UNITED STATES PATENTS

| | | | |
|---|---|---|---|
| 2,483,790 | 10/1949 | Stanko | 343/100 PE |
| 3,171,125 | 2/1965 | Butler | 343/100 PE |
| 3,268,894 | 8/1966 | Lewis et al. | 343/100 PE |
| 3,311,916 | 3/1967 | Packard | 343/100 PE |
| 3,560,977 | 2/1971 | Cayzac | 343/100 PE |
| 3,836,973 | 9/1974 | Shnitkin et al. | 343/100 PE |

*Primary Examiner*—Maynard R. Wilbur
*Assistant Examiner*—S. C. Buczinski
*Attorney, Agent, or Firm*—Joseph E. Rusz; Willard R. Matthews, Jr.

[57] ABSTRACT

A radar system is operated in a manner that provides determination of the coincidence of radar signal polarization with the major axis of a target of unknown aspect angle. This information so obtained can be utilized to enhance radar signals or to improve target identification capabilities. One approach comprehends transmitting circularly polarized radar signals and receiving return signals on a linearly polarized receive antenna. By varying the polarization of the receive antenna over a 180° range signal maxima and minima are detected that correspond to alignment of the target's major axis with the radar signal E and H field vectors. The method can also be practiced by transmitting linearly polarized radar signals, the polarization of which is also varied over a 180° range.

2 Claims, 7 Drawing Figures

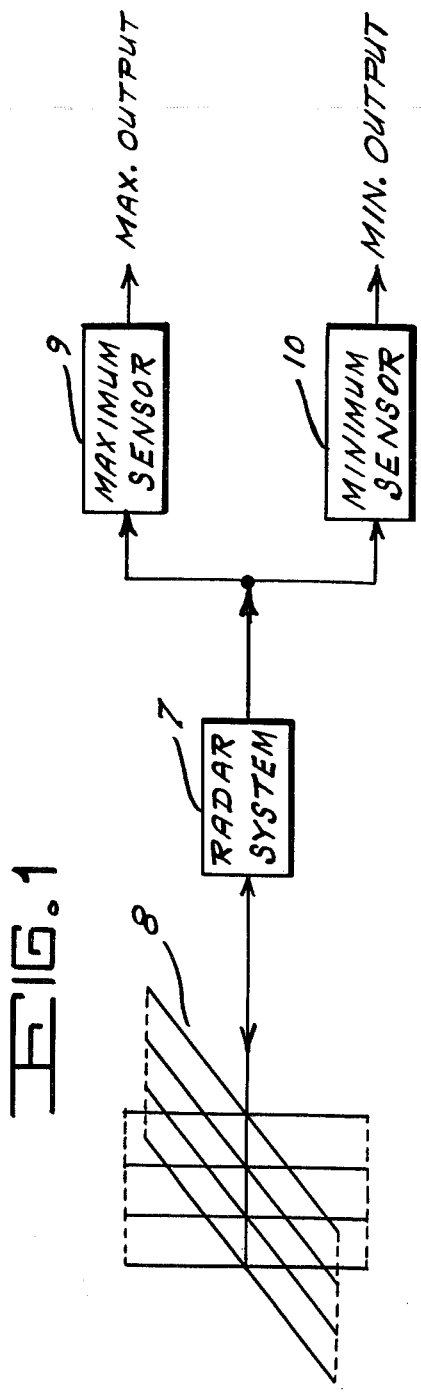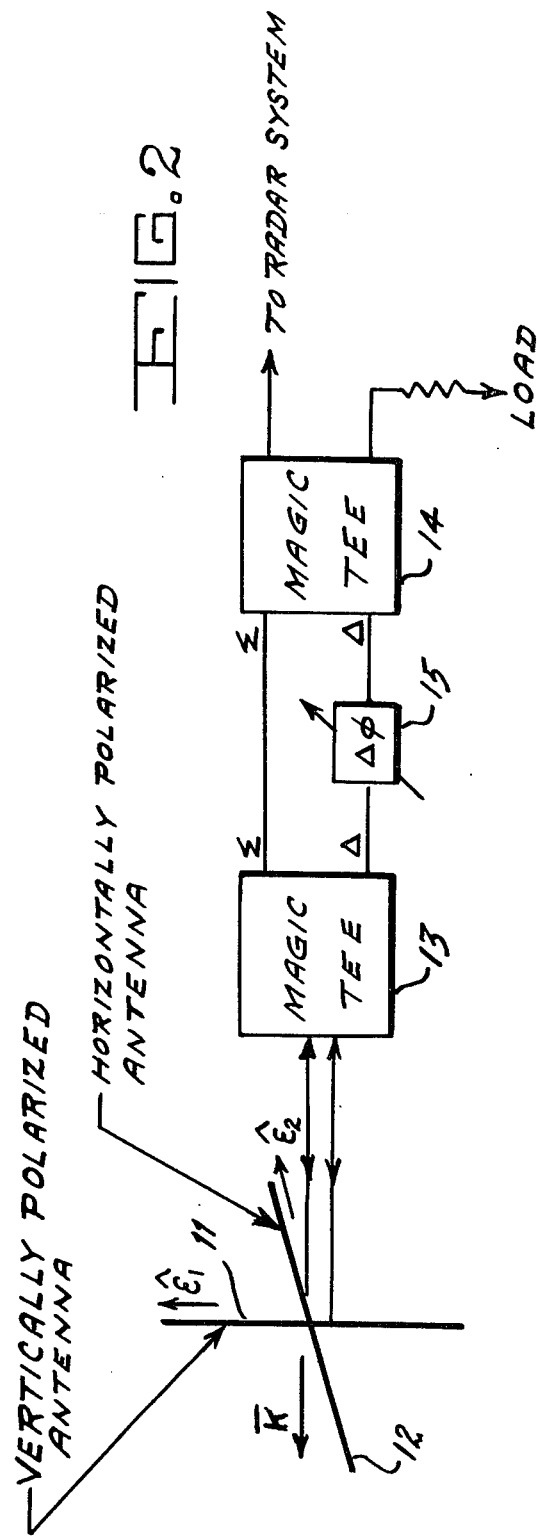

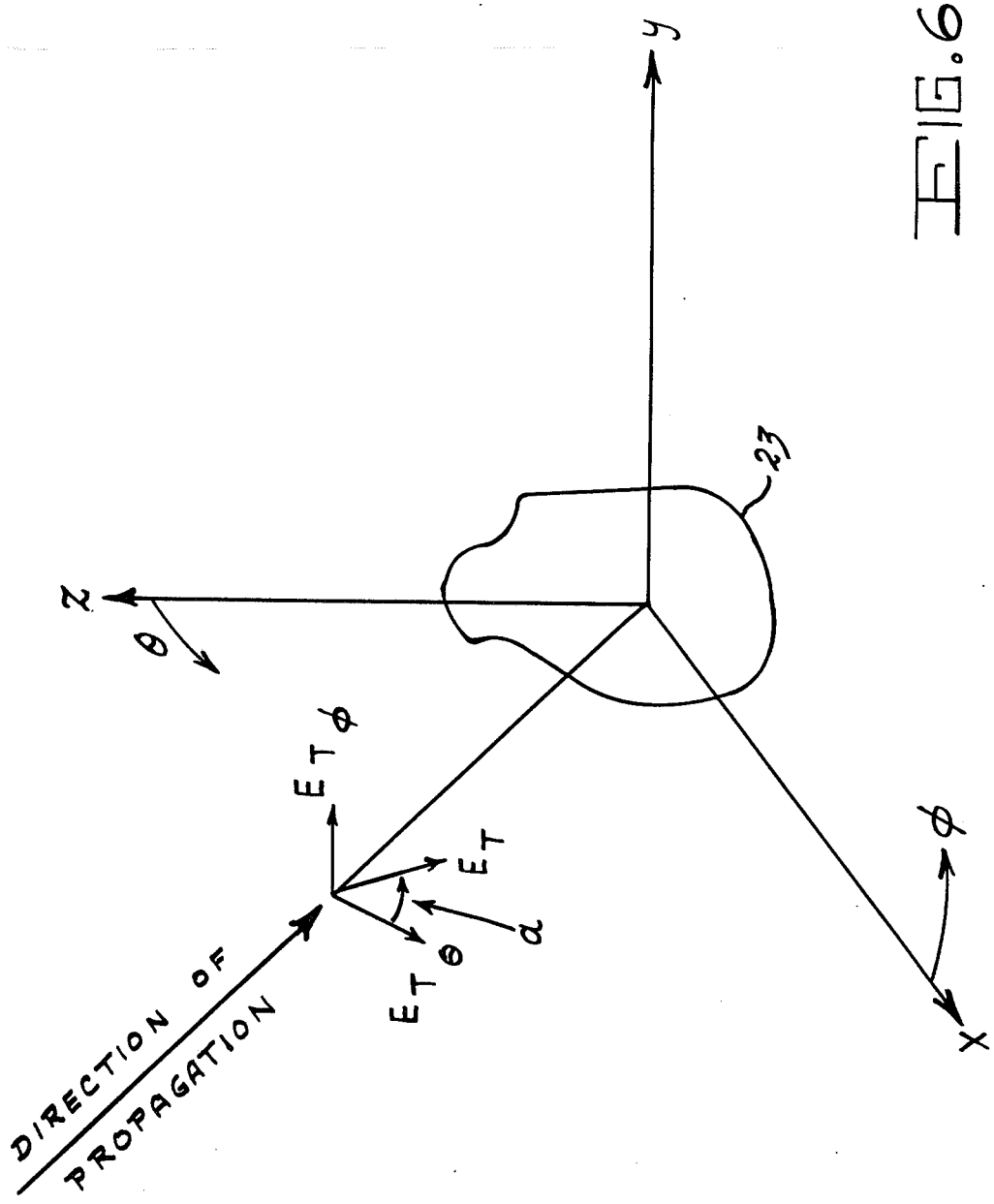

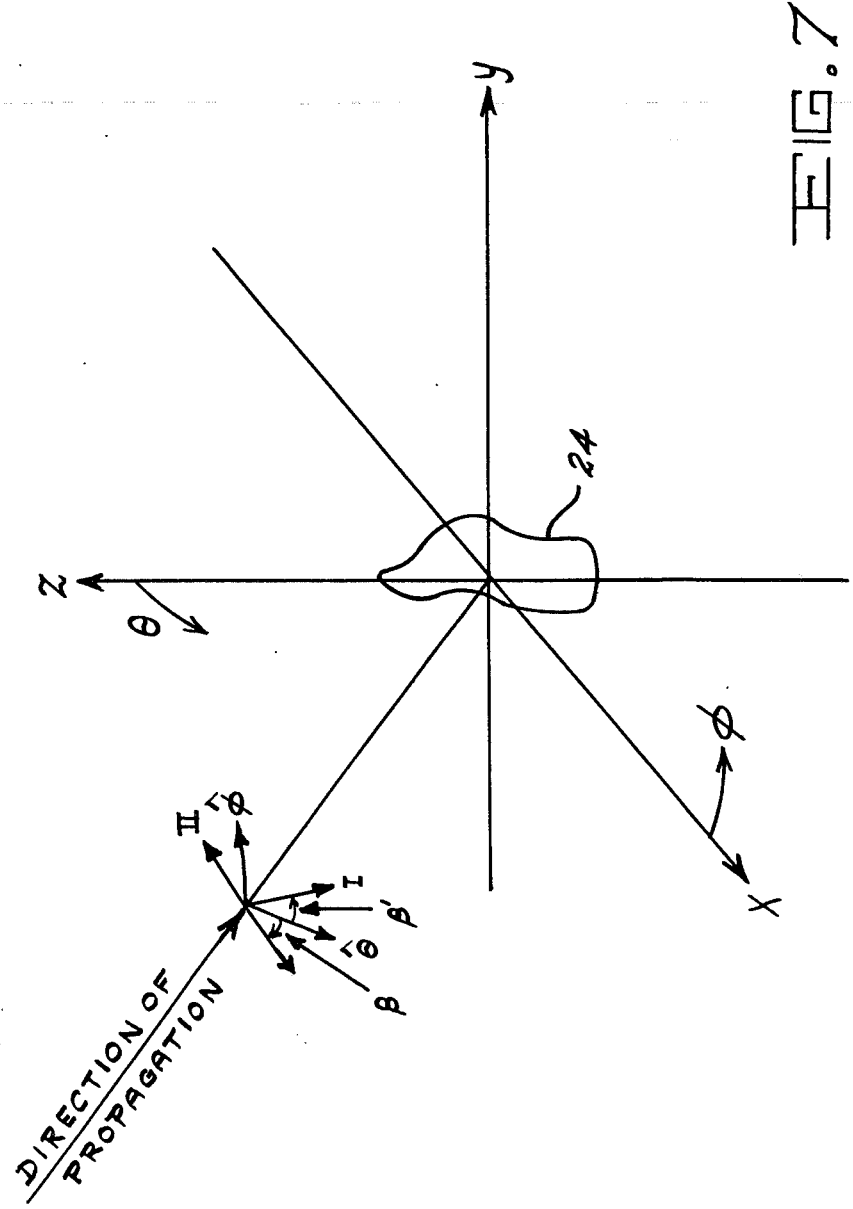

METHOD FOR PROVIDING MEANS TO ELIMINATE AMBIGUOUS POLARIZATION EFFECTS ON PHASE AND AMPLITUDE OF RADAR BACKSCATTER DUE TO UNKNOWN TARGET ASPECT ANGLE

STATEMENT OF GOVERNMENT INTEREST

The invention described herein may be manufactured and used by or for the Government for governmental purposes without the payment of any royalty thereon.

BACKGROUND OF THE INVENTION

This invention relates to radar systems, and in particular to methods of operation thereof that overcome the effects of certain backscatter ambiguities due to unknown target aspect angle.

When a radar system transmits and receives with fixed polarization and the target is at an unknown aspect angle the orientation of the E and H field vectors (polarization) with respect to the target are unknown. The amplitude and phase of the return depends on the orientation of the field vectors with respect to the target; thus if the target is illuminated with a radar with fixed polarization there is an uncertainty or ambiguity in the information contained in the amplitude and phase measurement made by the radar system for that target.

The quality of radar return signal can be improved by aligning the polarization of transmitted signals with the major axis of a target. Also, in radar applications in which target identification is an object, determination of the orientation of a target major axis is of primary importance. Substantial improvement in the performance of certain radar systems can therefore be achieved by eliminating such polarization ambiguity effects. The present invention is directed toward methods of radar system operation that effectively accomplish this end.

SUMMARY OF THE INVENTION

The invention comprehends a method of radar system operation adapted to eliminate ambiguity polarization effects whereby the radar transmits on circular or variable linear polarization and then receives on variable linear polarization. Coincidence between the phase of the transmitted signals with a target major axis is determined by looking for maxima and minima of the returned signal at the radar as the receive polarization vector is varied. From a knowledge of the scattering matrix, which is a matrix that relates copolarized and cross polarized energy reflected from a target to the incident energy, it can be calculated what the maxima and minima should be. The maxima and minima are shown to be unique and independent of target aspect angle.

It is a principal object of the invention to provide new and improved methods of operating a radar system to eliminate certain ambiguous polarization effects due to unknown target aspect angle.

It is another object of the invention to provide a method of operating a radar system that permits determination of the coincidence of radar signal polarization with the major axis of a target of unknown aspect angle.

These, together with other objects, features and advantages of the invention, will become more readily apparent from the following detailed description taken in conjunction with the illustrative embodiment in the accompanying drawings.

DESCRIPTION OF THE DRAWINGS

FIG. 1 is a block diagram of a radar system, antenna, and other components used in practicing the methods of the invention;

FIG. 2 illustrates schematically means for providing variable linear polarization in operation of the radar system of FIG. 1;

FIG. 6 illustrates the relationship between an incident radar signal and a target of unknown aspect angle for the circular polarization case; and FIG. 7 illustrates the relationship between an incident radar signal and a target of unknown aspect angle for the circular polarization case.

DETAILED DESCRIPTION OF THE PREFERRED EMBODIMENTS

Figure 3:
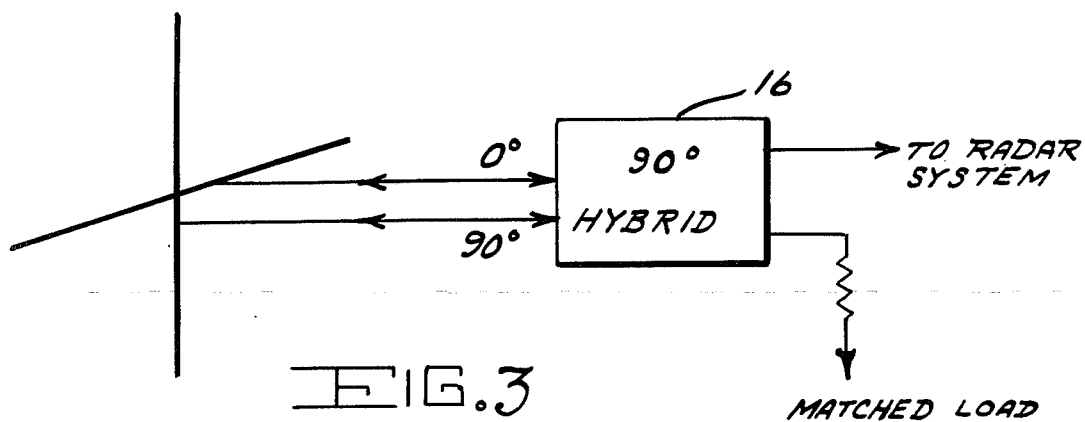
FIG. 3 illustrates schematically means for providing circular polarization in operation of the radar system of FIG. 1.

The two basic methods of the invention can best be understood by referring to FIG. 1. The radar system 7 of FIG. 1 in accordance with the fist method uses linear polarization both on transmit and receive. The polarization of the antenna 8 is set initially to say horizontal and a pulse transmitted and received by radar 7, producing an output of a given magnitude and phase. As radar 7 continues to transmit and receive pulses the polarization of the radar antenna 8 is varied. It shall be shown later that varying the polarization of antenna 8 will in general cause the return to go through a maximum and minimum and that this maximum and minimum can be calculated from a knowledge of the scattering matrix. The scattering matrix is a relationship between the incident and backscattered fields when electromagnetic energy impinges upon an object. The maximum and minimum are sensed by the maximum and minimum sensors 9 and 10 respectively and outputted for further processing.

The second method of the invention is much the same as that described above except that antenna 8 is operated in the circular polarization mode on transmit and in the variable linear polarization mode on receive. Again the linear polarization is varied while the radar 7 is pulsing and the maximum and minimum outputs of the radar are sensed and outputted by the maximum and minimum sensors 9 and 10. It will also be shown that the maximum and minimum can again be calculated from a knowledge of the scattering matrix for the target.

FIG. 2 shows one possible way to build an antenna for either variable linear or circular polarization. Let antenna element 11 be vertically polarized so that its transmitted signal anyplace in space at $\overline{X}$ is $$\overline{E}_1 = \hat{\epsilon}_1 E_1 e^{j(\overline{k} \cdot \overline{x} - wt + \phi_1)} \tag{1}$$

where $\hat{\epsilon}$ is a unit vector in the vertical direction, $\overline{k}$ is the direction of propagation and $w$ is the frequency in radians per second. Similarly antenna element 12 is horizontally polarized so that $$\vec{E}_2 = \hat{e}_2 \, E_2 \, e^{j(\vec{K}\cdot\vec{r} - \omega t + \phi_2)} \qquad (2)$$

wherein $\hat{e}_2$ is a unit vector in the horizontal direction. The total field of the antenna will be $$\vec{E}(\vec{r}, t) = (\hat{e}_1 \, E_1 \, e^{j\phi_1} + \hat{e}_2 \, E_2 \, e^{j\phi_2}) \, e^{j(\vec{K}\cdot\vec{r} - \omega t)} \qquad (3)$$

if $\phi_1 = \phi_2$ (the antennas are driven at the same phase) the field is linearly polarized with the polarization vector making an angle $\phi_1 = \tan^{-1}(E_2/E_1)$ with $\hat{e}_1$. Thus to vary the polarization of the antenna it is only necessary to vary the ratio of the magnitudes $E_1$ and $E_2$.

The interconnections of the two magic tees 13 and 14 and the variable phase shifter 15 shown in FIG. 2 is a common method of varying the ratio of $E_1$ and $E_2$ while keeping the phases of the driving voltage the same. The magnitude of the total field vector $$|\vec{E}| = \sqrt{\overline{E_1}^2 + \overline{E}^2} \qquad (4)$$

will be kept the same using this method.

To achieve circular polarization the horizontally polarized antenna 12 must be driven 90° out of phase from the vertically polarized antenna 11. This can be done as shown in FIG. 3 by using a 90° hybrid 16.

Figure 4:
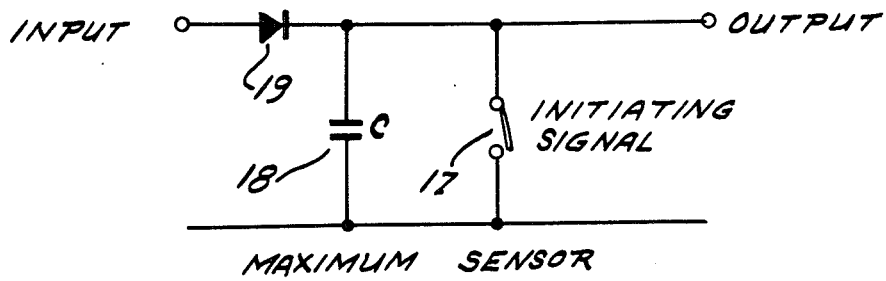
FIg. 4 is a schematic diagram of the maximum sensor of the radar system of FIG. 1.

A maximum sensor can be constructed as shown in FIG. 4. Assume that the load resistance of the output, $R_{L1}$ is such that the time constant $R_{Lc}$ is large compared with this length of time it takes the antenna to go through one cycle of polarization rotation. At the beginning of the period an initiating signal is sent to the switch 17 to ensure that the initial charge on the capacitor 18 is zero. The switch 17 is closed only momentarily and remains open during the measurement. As long as the input voltage is greater than that stored in capacitor 18 the diode 19 is forward biased and the capacitor 18 charges to the level of the input voltage. If the input voltage drops below that which is stored on the capacitor 18 the diode 19 is reverse biased and the capacitor 18 is prevented from discharging. Thus at the end of the period the voltage stored on the capacitor 18 will be the maximum input voltage during the period.

Figure 5:
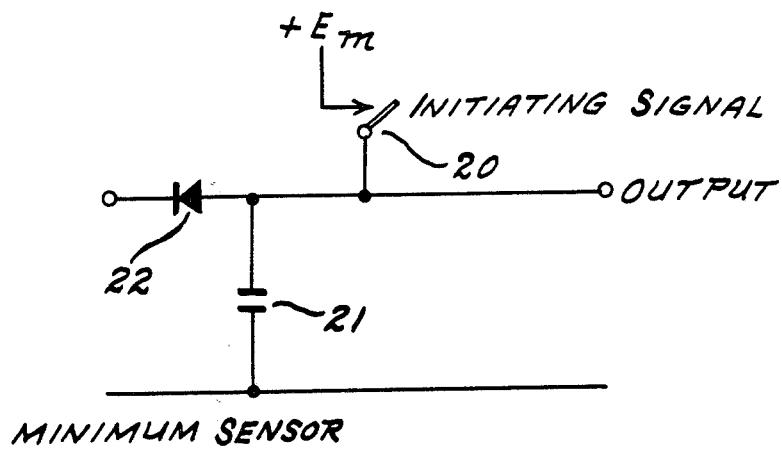
FIG. 5 is a schematic diagram of the minimum sensor of the radar system of FIG. 1.

A minimum sensor can be constructed as shown by the circuit arrangement of diode 22, switch 20 and capacitor 21 shown in FIG. 5. The operation of the minimum sensor is much the same except that this diode 22 is reversed and the initial voltage stored in the capacitor is Em. Em must be greater than any input voltage encountered during the measurement period.

Having reference now to the first method of the invention it will be demonstrated that if the radar system transmits and receives a linearly polarized wave over a 180° range of polarization angles there exists a polarization angle for which the return is a minimum; in addition, the values of the maximum and minimum may be calculated from a knowledge of the scattering matrix of the object.

The second method depends on the following: a circularly polarized wave is transmitted and it is received with a linearly polarized antenna. There is a polarization angle at which the return is maximum. The minimum return is at a polarization angle oriented 90° from that for the maximum. The values of the maximum and minimum can in this case also be calculated from the scattering matrix.

With both of these methods the scattering can be measured with a practical radar system so that the polarization effects are predictable from the scattering matrix. This leaves unsolved only one effect of the unknown aspect angle on the scattering, instead of two. The dimensionality of the problem is thus effectively cut in half.

For the linearly polarized case refer to FIG. 6. Let an arbitrarily shaped scatterer 23 be located at the origin. A linearly polarized plane wave propagates from an arbitrary direction toward the scatterer. The plane wave has an electric field vector $\vec{E}_T$ that is rotated at an unknown angle $\alpha$ from a unit vector in the $\theta$ direction. Let $\hat{E}_T$ be a unit vector in the $\vec{E}_T$ direction. Suppressing the time dependence of the wave, resolve $\vec{E}_T$ into $\theta$ and $\phi$ components;

$$E_{T_\theta} = \overline{E}_T \cos \alpha$$
$$E_{T_\phi} = \overline{E}_T \sin \alpha \qquad (5)$$

multiplying these components by the complex scattering matrix yields the scatter components in the $\theta$ and $\phi$ directions:

$$\begin{bmatrix} E_{s_\theta} \\ E_{s_\phi} \end{bmatrix} = \begin{bmatrix} S_{\theta\theta} & S_{\theta\phi} \\ S_{\theta\phi} & S_{\phi\phi} \end{bmatrix} \begin{bmatrix} E_{T_\theta} \\ E_{T_\phi} \end{bmatrix}. \qquad (6)$$

Note that for backscatter, the scattering matrix is symmetric. Together with equation (5), Equation (6) yields:

$$E_{s_\theta} = S_{\theta\theta} E_T \cos \alpha + S_{\theta\phi} E_T \sin \alpha$$
$$E_{s_\phi} = S_{\theta\phi} E_T \cos \alpha + S_{\phi\phi} E_T \sin \alpha . \qquad (7)$$

If this is resolved back toward the $\vec{E}_T$ direction, $$E_{s_T} = \left[ \hat{\theta} E_{s_\theta} + \hat{\phi} E_{s_\phi} \right] \cdot \hat{E}_T , \qquad (8)$$

where $\hat{\theta}$ and $\hat{\phi}$ are unit vectors in the $\theta$ and $\phi$ are unit vectors in the $\theta$ and $\phi$ directions, respectively. Thus, $$E_{s_T} = S_{\theta\theta} E_T \cos^2\alpha + 2S_{\theta\phi} E_T \sin\alpha\cos\alpha + S_{\phi\phi} E_T \sin^2\alpha \qquad (9)$$

The measurement that the radar system can make is the magnitude of $E_{s_T}$. Note that this value is a function of $\alpha$ and of the scattering matrix of the object. The polarization angle can be varied at the radar while measuring $|E_{s_T}|$. The technique followed is to vary the polarization angle $\alpha$ through 180° at the radar while searching for the maximum and minimum of $E_{s_T}$. Even though $\alpha$ cannot be measured because the orientation of the $\phi$, $\theta$ corrdinate system with respect to the radar is not known the maximum and minimum can be calculated from the scattering matrix, which must be measured and known.

The maximum and minimum of $|E_{s_T}|$ occur at the same value of $\alpha$ at which the maximum and minimum of $|E_{s_T}|^2$ occur. Thus, $$|E_{s_T}|^2 = E_s E_s^*$$
$$= (S_{\theta\theta}E_T\cos^2\alpha + 2 S_{\theta\phi}E_T \sin\alpha \cos\alpha + S_{\phi\phi}E_T\sin^2\alpha)$$
$$+ (S_{\theta\theta} E_T^*\cos^2\alpha + 2S_{\theta\phi}\sin\alpha\cos\alpha^* + S_{\phi\phi}E_T^*\sin^2\alpha) \quad (10)$$

Let $$S_{\theta\theta}E_T = A,$$
$$S_{\theta\phi}E_T = B,$$
$$S_{\phi\phi}E_T = C.$$

Then $$|E_{s_T}|^2 = AA \cos^4\alpha + 2(AB + AB)\sin\alpha \cos^3\alpha$$
$$+ (AC + 4BB + AC)\cos^2\alpha \sin^2\alpha$$
$$+ 2(BC + BC)\sin^3\alpha \cos\alpha + CC \sin^4\alpha. \quad (11)$$

Note that all the coefficients in $|E_{s_T}|^2$ are real. To find the value of $\alpha$ for which $|E_{s_T}|^2$ is maximum or minimum, differentiate the function with respect to $\alpha$ and set the result equal to zero. Let $$a = AA^*,$$
$$b = 2(A^*B + AB^*),$$
$$c = (A^*C + 4BB^* + AC^*),$$
$$d = 2(B^*C + BC^*),$$
$$e = CC^*. \quad (12)$$

Then $$(-4a + 2c)\cos^3\alpha \sin\alpha + (4e - 2c)\sin^3\alpha \cos\alpha + (3D - 3b)\sin^2\alpha \cos^2\alpha + b \cos^4\alpha - d \sin^4\alpha = 0. \quad (13)$$

This equation is of the form $$VV \sin^4\alpha + W \sin^3\alpha \cos\alpha + X \sin^2\alpha + Y \cos^3\alpha \sin\alpha + Z \cos^4\alpha = 0 \quad (14)$$

where $$VV = -2(B^*C + BC^*)$$
$$W = 4CC^* - 2(A^*C + 4BB^* + AC^*)$$
$$X = -6(A^*B + AB^* - B^*C - BC^*)$$
$$Y = -4AA^* + 2(A^*C + 4BB^* + AC^*)$$
$$Z = 2(A^*B + AB^*). \quad (15)$$

Dividing Equation (14) by $\cos^4\alpha$, yields $$VV \tan^4\alpha + W \tan^3\alpha + X \tan^2\alpha + Y \tan\alpha + Z = 0, \quad (16)$$

which can be solved for $\alpha$. The four values of $\alpha$ from Equation (16) can then be substituted into Equation (11) and the maximum and minimum found. Division by zero is of no concern here because for $\cos\alpha$ to equal zero, $\alpha$ must equal $(2n-1)\pi/2$, in which case $\sin\alpha = \pm 1$, which can hold only if $V = 0$. Note that if $V = 0$, a solution of equation (14) is $$\alpha = n\pi/2; n = 1, 3, 5, \ldots \quad (17)$$

In this case, solve $$W \tan^3\alpha + X \tan^2\alpha + Y \tan\alpha + Z = 0 \quad (18)$$

for the remaining three values of $\alpha$. The fourth value of $\alpha$ is taken to be $$\alpha = \pi/2 \quad (19)$$

because $\alpha = (2n-1)\pi/2$ will give the same maximum as $\alpha = \pi/2$ since the 180° rotation of the polarization vector gives the same resultant magnitude.

For the special case of a body of revolution about the z axis, the cross-polarized terms in the scattering matrix are zero and thus $B = B^* = 0$, and Equation (14) becomes $$W \sin^3\alpha \cos\alpha + Y \cos^3\alpha \sin\alpha = 0. \quad (20)$$

Two principal solutions of this are: $\alpha = 0$; $\alpha = \pi/2$. Other solutions are found by dividing Equation (20) by $\sin\alpha \cos\alpha$ to get $$W \sin^2\alpha = -Y \cos^2\alpha \quad (21)$$

or, $$\tan^2\alpha = -Y/W \quad (22)$$

which implies $$\tan\alpha = \pm (-Y/W)^{1/2} \quad (23)$$

which can be written $$\alpha = \tan^{-1} \pm \left[\frac{4AA - 2(AC + AC)}{4CC - 2(AC + AC)}\right]^{1/2} \quad (24)$$

or $$\alpha = \tan^{-1} \pm \left[\frac{|A|^2 - Re(AC)}{|C|^2 - Re(AC)}\right]^{1/2}. \quad (25)$$

If the radical is imaginary, the zero and $\pi/2$ values of $\alpha$ are the maximum and minimum.

Thus, the maximum and minimum of the received signal as the polarization vector is rotated can by this method be calculated from the known scattering matrix at any particular aspect angle.

To implement this in a radar system, a method for rotating the polarization vector must be devised. In a microwave system using a parabolic reflector antenna this could be done mechanically by rotating the feed. At lower frequencies it may be necessary to vary the polarization electronically by varying the amplitude and relative phase fed to separate horizontally and vertically polarized antennas. Amplitude and phase control units capable of handling high transmitter powers would be necessary.

The second way of eliminating the polarization ambiguity that arises when the target aspect angle is unknown-to transmit a circularly polarized wave and receive on variable linear polarization-is somewhat more practical to implement because large amounts of transmitted power do not have to be varied, as in the linearly polarized case. FIG. 7 shows a scatterer 24 at the origin, with a plane circularly polarized wave propagating from an arbitrary direction. The circularly polarized wave is generated by two linearly polarized waves, I and II, separated by $\pi/2$ in space and $\pi/2$ in phase. Their electric field vectors are of equal magnitude. The electric field vector I is displaced by an unknown angle $\beta'$ from $\theta$; the electric field vector II will be in the direction $\beta' + \pi/2$ from $\theta$, lagging I in phase by $\pi/2$. The incident electric fields in the $\theta$ and $\phi$ directions will be $$E_\theta^i = \cos\beta' - \sin\beta' \, e^{-j\pi/2},$$
$$E_\phi^i = \sin\beta' + \cos\beta' \, e^{-j\pi/2}. \tag{26}$$

The range dependence and $e^{j\omega t}$ factor common to both are suppressed. To get the scattered field, multiply by the scattering matrix:

$$\begin{bmatrix} E_\theta^s \\ E_\phi^s \end{bmatrix} = \begin{bmatrix} S_{\theta\theta} & S_{\theta\phi} \\ S_{\theta\phi} & S_{\phi\phi} \end{bmatrix} \begin{bmatrix} \cos\beta' - \sin\beta' \, e^{-j\pi/2} \\ \sin\beta' + \cos\beta' \, e^{-j\pi/2} \end{bmatrix}, \tag{27}$$

or (28)

$$E_\theta^s = S_{\theta\theta}(\cos\beta' - \sin\beta' e^{-j\pi/2}) + S_{\theta\phi}(\sin\beta' + \cos\beta' e^{-j\pi/2}),$$
$$E_\phi^s = S_{\theta\phi}(\cos\beta' - \sin\beta' e^{-j\pi/2}) + S_{\phi\phi}(\sin\beta' + \cos\beta' e^{-j\pi/2}).$$

The signal received by the linearly polarized antenna displaced from $\theta$ by an arbitrary angle $\beta$ is $$E_R = E_\theta^s \cos\beta + E_\phi^s \sin\beta \tag{29}$$

($E_R$ is a complex number). Substituting Equation (28) into Equation (29), $$E_R = [S_{\theta\theta}(\cos\beta' - \sin\beta' e^{-j\pi/2}) + S_{\theta\phi}(\sin\beta' + \cos\beta + e^{-j\pi/2})]\cos\beta \\ + [S_{\theta\phi}(\cos\beta' - \sin\beta' e^{-j\pi/2}) + S_{\phi\phi}(\sin\beta' + \cos\beta' e^{-j\pi/2})]\sin\beta. \tag{30}$$

In order to maximize $|E_R|$, we use $|E_R|^2$.

$$|E_R|^2 = E_R E_R^*$$
$$= \{[S_{\theta\theta}^*(\cos\beta' - \sin\beta' e^{j\pi/2}) + S_{\theta\phi}^*(\sin\beta' + \cos\beta' e^{j\pi/2})]\cos\beta \\ + [S_{\theta\phi}^*(\cos\beta' - \sin\beta' e^{j\pi/2}) + S_{\phi\phi}^*(\sin\beta' + \cos\beta' e^{j\pi/2})]\sin\beta\} \\ \times \{[S_{\theta\theta}(\cos\beta' - \sin\beta' e^{-j\pi/2}) + S_{\theta\phi}(\sin\beta' + \cos\beta' e^{-j\pi/2})]\cos\beta \\ + [S_{\theta\phi}(\cos\beta' - \sin\beta' e^{-j\pi/2}) + S_{\phi\phi}(\sin\beta' + \cos\beta' e^{-j\pi/2})]\sin\beta\}. \tag{31}$$

Expanding, $$|E_R|^2 = [S_{\theta\theta}^* S_{\theta\theta}(\cos\beta' - \sin\beta' e^{j\pi/2})(\cos\beta' - \sin\beta' e^{-j\pi/2}) \\ + S_{\theta\theta}^* S_{\theta\phi}(\cos\beta' - \sin\beta' e^{j\pi/2})(\sin\beta' + \cos\beta' e^{-j\pi/2})]\cos^2\beta \\ + [S_{\theta\phi}^* S_{\theta\theta}(\cos\beta' - \sin\beta' e^{j\pi/2})(\cos\beta' - \sin\beta' e^{-j\pi/2}) \\ + S_{\theta\phi}^* S_{\theta\phi}(\cos\beta' - \sin\beta' e^{j\pi/2})(\sin\beta' + \cos\beta' e^{-j\pi/2})] \sin\beta\cos\beta \\ + [S_{\theta\theta}^* S_{\theta\phi}(\sin\beta' + \cos\beta' e^{j\pi/2})(\cos\beta' - \sin\beta' e^{-j\pi/2}) \\ + S_{\theta\phi}^* S_{\theta\phi}(\sin\beta' + \cos\beta' e^{j\pi/2})(\sin\beta' + \cos\beta' e^{-j\pi/2})]\cos^2\beta \\ + [(S_{\theta\phi}^* S_{\theta\theta}(\sin\beta' + \cos\beta' e^{j\pi/2})(\cos\beta' - \sin\beta' e^{-j\pi/2}) + \\ + S_{\theta\phi}^* S_{\phi\phi}(\sin\beta' + \cos\beta' e^{j\pi/2})(\sin\beta' + \cos\beta' e^{-j\pi/2})] \cos\beta\sin\beta \\ + [S_{\theta\theta}^* S_{\theta\phi}(\cos\beta' - \sin\beta' e^{j\pi/2})(\cos\beta' - \sin\beta' e^{-j\pi/2}) \\ + S_{\theta\phi}^* S_{\phi\phi}(\cos\beta' - \sin\beta' e^{j\pi/2})(\sin\beta' + \cos\beta' e^{-j\pi/2})] \sin\beta\cos\beta \\ + [S_{\theta\phi}^* S_{\theta\phi}(\cos\beta' - \sin\beta' e^{j\pi/2})(\cos\beta' - \sin\beta' e^{-j\pi/2}) \\ + S_{\theta\phi}^* S_{\phi\phi}(\cos\beta' - \sin\beta' e^{j\pi/2})(\sin\beta' + \cos\beta' e^{-j\pi/2})] \sin^2\beta \\ + [S_{\phi\phi}^* S_{\theta\theta}(\sin\beta' + \cos\beta' e^{j\pi/2})(\cos\beta' - \sin\beta' e^{-j\pi/2}) \\ + S_{\phi\phi}^* S_{\theta\phi}(\sin\beta' + \cos\beta' e^{j\pi/2})(\sin\beta' + \cos\beta' e^{-j\pi/2})] \cos\beta\sin\beta \\ + [S_{\phi\phi}^* S_{\theta\phi}(\sin\beta' + \cos\beta' e^{j\pi/2})(\cos\beta' - \sin\beta' e^{-j\pi/2}) \\ + S_{\phi\phi}^* S_{\phi\phi}(\sin\beta' + \cos\beta' e^{j\pi/2})(\sin\beta' + \cos\beta' e^{-j\pi/2})] \sin^2\beta. \tag{32}$$

At this point it must be shown that Eq. (32) is independent of $\beta'$, since this is the unknown angle between the transmitting antenna and the $\phi$, $\theta$ coordinates. Note that $$(\cos\beta' - \sin\beta' e^{j\pi/2})(\cos\beta' - \sin\beta' e^{-j\pi/2}) \\ = \cos^2\beta' - \cos\beta'\sin\beta'(e^{-j\pi/2} + e^{j\pi/2}) + \sin^2\beta' \\ = 1 - 2\cos\beta'\sin\beta'\cos\pi/2 = 1. \tag{33}$$

Similarly, $$(\cos\beta' - \sin\beta' e^{j\pi/2})(\sin\beta' + \cos\beta' e^{-j\pi/2}) = -j \tag{34}$$
and
$$(\sin\beta' + \cos\beta' e^{j\pi/2})(\cos\beta' - \sin\beta' e^{-j\pi/2}) = j. \tag{35}$$

Substituting (78), (79), and (80), into (77) and simplifying.

$$(\cos\beta' - \sin\beta' e^{j\pi/2})(\sin\beta' + \cos\beta' e^{-j\pi/2}) = -j \tag{34}$$
and
$$(\sin\beta' + \cos\beta' e^{j\pi/2})(\cos\beta' - \sin\beta' e^{-j\pi/2}) = j. \tag{35}$$

$$|E_R|^2 = (S_{\theta\theta}^* S_{\theta\theta} - j S_{\theta\theta}^* S_{\theta\phi} + j S_{\theta\theta} S_{\theta\phi}^* + S_{\theta\phi} S_{\theta\phi}^*) \cos^2\beta \\ + (S_{\theta\theta}^* S_{\theta\phi} + S_{\theta\theta} S_{\theta\phi}^* + S_{\theta\phi} S_{\phi\phi}^* + S_{\phi\phi} S_{\theta\phi}^* \\ + j S_{\theta\phi}^* S_{\theta\theta} - j S_{\theta\theta}^* S_{\phi\phi}) \sin\beta\cos\beta \\ + (S_{\theta\phi}^* S_{\theta\phi} - j S_{\theta\phi}^* S_{\phi\phi} + j S_{\phi\phi}^* S_{\theta\phi} + S_{\phi\phi}^* S_{\phi\phi}) \sin^2\beta. \tag{36}$$

For complex numbers note that $$XY^* + X^*Y = 2\,\text{Re}\,(XY^*),$$
$$jXY^* - jX^*Y = 2\,\text{Im}\,(X^*Y). \tag{37}$$

By virtue of (37) all the coefficients in (36) are real, and may be written as $$|E_R|^2 = A \cos^2 \beta + B \sin \beta + C \sin^2 \beta, \quad (38)$$

where $$A = |S_{\theta\theta}|^2 + 2\, Im(S_{\theta\theta}^* S_{\theta\phi}) + |S_{\theta\phi}|^2,$$

$$B = 2\, Re(S_{\theta\theta}^* S_{\theta\phi}) + 2\, Im(S_{\theta\theta}^* S_{\phi\phi}) + 2\, Re(S_{\theta\phi}^* S_{\phi\phi}),$$

$$C = |S_{\theta\phi}|^2 + |S_{\phi\phi}|^2 + 2\, Im(S_{\theta\phi} S_{\phi\phi}).$$

Setting the derivative of $|E_R|^2$ equal to zero, $$\frac{d|E_R|^2}{d\beta} = 2(C - A) \sin \beta \cos \beta + B(\cos^2 \beta - \sin^2 \beta) = 0. \quad (39)$$

Using the double angle trigonometric relations, $$(C-A) \sin 2\beta + B \cos 2\beta = 0, \quad (40)$$

or, $$\tan 2\beta = b/A - C, \quad (41)$$

which yields $$\beta = \tfrac{1}{2} \tan^{-1} B/A - C. \quad (42)$$

The two values of $\beta$ separated by $\pi/2$ that will satisfy Equation (41), corresponding one to the maximum and one to the minimum, are determined by substituting the values of $\beta$ from (42) into (38). For the case of a rotationally symmetric scatterer, $$S_{\theta\phi} = S_{\theta\phi}^* = 0$$

and $$\beta = \tfrac{1}{2} \tan^{-1} \frac{2\, Im(S_{\theta\theta} S_{\phi\phi})}{|S_{\theta\theta}|^2 - |S_{\phi\phi}|^2} \quad (43)$$

Thus, in measuring the backscatter the maximum and minimum in the received signal by using circular polarization for transmitting, and sweeping a linear polarization around 180° while receiving. These levels can be computed from the scattering matrix.

The two methods that have been described do not require knowledge of the polarization effects due to unknown target aspect angle. Target amplitudes directly related to the target scattering matrix can be measured by a radar system. The target scattering matrix can be determined, either computationally or experimentally, for the target of interest.

While the invention has been described in its preferred embodiments, it is understood that the words which have been used are words of description rather than words of limitation and that changes within the purview of the appended claims may be made without departing from the scope and spirit of the invention in its broader aspects.

I claim:

1. A method of radar system operation adapted to provide determination of the major axis of a target of unknown aspect angle comprising the steps of
    operating a radar transmit antenna in a circular polarization mode,
    operating a radar receive antenna in a variable linear polarization mode, said linear polarization being varied over a 180° range,
    acquiring data for return signal values versus receive antenna polarization orientations for all receive antenna polarization angles, and
    determining the target major axis as being coincident with the receive antenna polarization angle corresponding to the maximum return signal value and orthogonal to the receive antenna polarization angle corresponding to the minimum return signal value.

2. A method of radar system operation adapted to provide determination of the major axis of a target of unknown aspect angle comprising the steps of
    operating a radar transmit antenna in a variable linear polarization mode, said linear polarization being varied over a 180° range,
    operating a radar receive antenna in a variable linear polarization mode, said linear polarization being varied over a 180° range.
    acquiring data for return signal values versus receive antenna polarization orientations for all receive antenna polarization angles, and
    determining the target major axis as being coincident with the receive antenna polarization angle corresponding to the maximum return signal value and orthogonal to the receive antenna polarization angle corresponding to the minimum return signal value.

* * * * *